(12) United States Patent
Jenkins et al.

(10) Patent No.: US 8,966,850 B2
(45) Date of Patent: Mar. 3, 2015

(54) ROOFING PRODUCTS, PHOTOVOLTAIC ROOFING ELEMENTS AND SYSTEMS USING THEM

(75) Inventors: Robert L. Jenkins, Honey Brook, PA (US); Husnu M. Kalkanoglu, Swarthmore, PA (US); Gregory F. Jacobs, Oreland, PA (US); Wayne E. Shaw, Glenn Mills, PA (US); Peter Chihlas, Lansdale, PA (US)

(73) Assignee: CertainTeed Corporation, Valley Forge, PA (US)

( * ) Notice: Subject to any disclaimer, the term of this patent is extended or adjusted under 35 U.S.C. 154(b) by 10 days.

(21) Appl. No.: 13/162,830

(22) Filed: Jun. 17, 2011

(65) Prior Publication Data

US 2012/0017972 A1    Jan. 26, 2012

Related U.S. Application Data

(60) Provisional application No. 61/358,703, filed on Jun. 25, 2010.

(51) Int. Cl.
| | |
|---|---|
| *E04D 1/12* | (2006.01) |
| *E04D 1/14* | (2006.01) |
| *E04D 1/28* | (2006.01) |
| *H01L 31/048* | (2014.01) |

(Continued)

(52) U.S. Cl.
CPC .............. *H01L 31/0482* (2013.01); *E04D 1/14* (2013.01); *E04D 1/28* (2013.01); *E04D 1/12* (2013.01); *E04D 1/26* (2013.01); *Y02B 10/12* (2013.01); *D06N 5/003* (2013.01); *Y02E 10/52* (2013.01)

USPC .............. 52/518; 52/554; 52/553; 52/746.11; 52/748.1; 428/143; 428/141

(58) Field of Classification Search
CPC ............... E04D 1/12; E04D 1/14; E04D 1/00; E04D 1/28; E04D 1/22
USPC .................... 428/143, 141, 150, 402.24, 403; 52/518, 554, 553, 519, 543, 746.1, 52/746.11, 748.1, 747.1
See application file for complete search history.

(56) References Cited

U.S. PATENT DOCUMENTS

| | | | | |
|---|---|---|---|---|
| 1,689,985 | A * | 10/1928 | Wardell | 428/150 |
| 6,228,785 | B1 * | 5/2001 | Miller et al. | 442/148 |
| 7,125,601 | B1 * | 10/2006 | Pinault et al. | 428/143 |

(Continued)

FOREIGN PATENT DOCUMENTS

WO        2006/121433        11/2006

*Primary Examiner* — Phi A
(74) *Attorney, Agent, or Firm* — McDonnell Boehnen Hulbert & Berghoff LLP

(57) ABSTRACT

The present invention relates more particularly to roofing products for use with photovoltaic elements, and to photovoltaic systems that include one or more photovoltaic elements joined to a roofing substrate. In one aspect, the invention provides a roofing product including: a bituminous roofing substrate having a top surface; and roofing granules embedded in the top surface of the roofing substrate, wherein in at least one over-pressed zone of the roofing product, the roofing granules are embedded so that (a) the over-pressed zone exhibits a 0.20 gram loss or less in a rub test as described in ASTM D-4977; or (b) in the over-pressed zone the average granule embed volume fraction is at least 0.5; or (c) in the over-pressed zone, the average distance between the top of the roofing granules and the top surface of the bituminous roofing substrate is 1.0 mm or less.

23 Claims, 10 Drawing Sheets

(51) Int. Cl.
   *E04D 1/26* (2006.01)
   *D06N 5/00* (2006.01)

(56) References Cited

U.S. PATENT DOCUMENTS

| | | | |
|---|---|---|---|
| 7,442,658 B2 * | 10/2008 | Rodrigues et al. | 442/20 |
| 7,541,059 B2 * | 6/2009 | Aschenbeck et al. | 427/188 |
| 7,785,510 B2 | 8/2010 | MacKinnon | |
| 8,211,528 B2 * | 7/2012 | Aschenbeck et al. | 428/150 |
| 2004/0071938 A1 * | 4/2004 | Fensel et al. | 428/143 |
| 2007/0026195 A1 * | 2/2007 | Pinault et al. | 428/141 |
| 2008/0115444 A1 | 5/2008 | Kalkanoglu | |
| 2008/0271773 A1 | 11/2008 | Jacobs et al. | |

* cited by examiner

ROOFING PRODUCTS, PHOTOVOLTAIC ROOFING ELEMENTS AND SYSTEMS USING THEM

CROSS-REFERENCE TO RELATED APPLICATIONS

The present application claims the priority of U.S. Provisional Patent Application Ser. No. 61/358,703, filed Jun. 25, 2010, which is hereby incorporated herein by reference in its entirety.

BACKGROUND OF THE INVENTION

1. Field of the Invention

The present invention relates generally to roofing products. The present invention relates more particularly to roofing products for use with photovoltaic elements, and to photovoltaic systems that include one or more photovoltaic elements joined to a roofing substrate.

2. Technical Background

The search for alternative sources of energy has been motivated by at least two factors. First, fossil fuels have become increasingly expensive due to increasing scarcity and unrest in areas rich in petroleum deposits. Second, there exists overwhelming concern about the effects of the combustion of fossil fuels on the environment due to factors such as air pollution (from $NO_x$, hydrocarbons and ozone) and global warming (from $CO_2$). In recent years, research and development attention has focused on harvesting energy from natural environmental sources such as wind, flowing water, and the sun. Of the three, the sun appears to be the most widely useful energy source across the continental United States; most locales get enough sunshine to make solar energy feasible.

Accordingly, there are now available components that convert light energy into electrical energy. Such "photovoltaic cells" are often made from semiconductor-type materials such as doped silicon in either single crystalline, polycrystalline, or amorphous form. The use of photovoltaic cells on roofs is becoming increasingly common, especially as device performance has improved. They can be used to provide at least a significant fraction of the electrical energy needed for a building's overall function; or they can be used to power one or more particular devices, such as exterior lighting systems.

Photovoltaic cells can be packaged as photovoltaic elements, in which one or more photovoltaic cells are electrically interconnected and provided in a common package. One common type of photovoltaic element is an encapsulated photovoltaic element, in which the photovoltaic cells are packaged together in between layers of layer material. The layer materials are often chosen to be highly light-transmissive, and to retain their transmissivity over time. Encapsulated photovoltaic elements can be convenient for integration with various substrates.

Roofing products in which a photovoltaic element is integrated with a roofing substrate (such as a shingle or tile) have been proposed. Such "photovoltaic roofing elements" (also known as "roofing-integrated photovoltaics" or "RIPV") can provide both protection from the elements and power generation capability in a single product. Moreover, photovoltaic roofing elements can provide aesthetic benefit, as they can be made to blend with the architecture of the overall roof much better than can conventional photovoltaic modules.

Encapsulated photovoltaic elements can be convenient for integration with various substrates. However, in many circumstances, formation of a long-lived physical connection between the material of the encapsulated photovoltaic element and the material of a substrate can be difficult, especially when the materials used to make the encapsulated photovoltaic element have low surface tension. Notably, the surfaces used as the top layer of many roofing substrates, such as the coated granules typically used with bituminous roofing products, can be less than optimal for adhesion to a photovoltaic element.

One disadvantage to the use of photovoltaic roofing elements is that they can require special skills and tools for installation, making them challenging for installation by a roofing professional. Moreover, once installed on a roof, they can be relatively susceptible to damage. Accordingly, at any point after a roof has photovoltaic roofing elements installed thereon, it can be more difficult for workers to perform any other necessary tasks on the roof.

There remains a need for roofing products and photovoltaic roofing systems that can address these deficiencies.

SUMMARY OF THE INVENTION

One aspect of the invention is a roofing product including:
a bituminous roofing substrate having a top surface; and
roofing granules embedded in the top surface of the roofing substrate, wherein in at least one over-pressed zone of the roofing product, the roofing granules are embedded so that
(a) the over-pressed zone exhibits a 0.20 gram loss or less in a rub test as described in ASTM D-4977; or
(b) in the over-pressed zone the average granule embed volume fraction is at least 0.5; or
(c) in the over-pressed zone, the average distance between the top of the roofing granules and the top surface of the bituminous roofing substrate is 1.0 mm or less.

Another aspect of the invention is a photovoltaic roofing element including
a roofing product as described above; and
one or more photovoltaic elements disposed on the one or more over-pressed zones of the roofing product.

Another aspect of the invention is a method for installing a photovoltaic roofing system, the method including
installing on a roof deck a roofing product according to claim 1; then
disposing one or more photovoltaic elements on the one or more over-pressed zones of the roofing products.

Another aspect of the invention is a kit for the installation of a photovoltaic roofing system, the kit including:
one or more roofing products according to claim 1; and
one or more photovoltaic elements.

The photovoltaic roofing elements, systems and kits of the present invention can result in a number of advantages. The over-pressed zone provides a granule-coated area that can provide a better surface for adhesion of an overlying device or structure, for example, of a photovoltaic element. The over-pressed zone can appear substantially similar to any non-overpressed zones, either on the same shingle or other shingles installed on a roof. Accordingly, if an overlying structure or device is not adhered in the over-pressed zone, the shingle will substantially match the surrounding roof area in appearance, and will be protected from light-induced decay by the granules. Other advantages will be apparent to the person of skill in the art

BRIEF DESCRIPTION OF THE DRAWINGS

The accompanying drawings are not necessarily to scale, and sizes of various elements can be distorted for clarity.

DETAILED DESCRIPTION OF THE INVENTION

Figure 1:
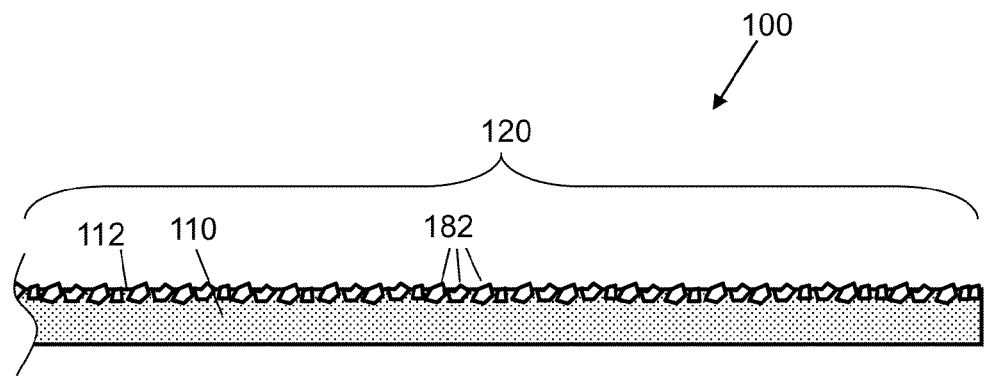
FIG. 1 is a partial schematic view of a roofing product according to one embodiment of the invention.

One embodiment of a roofing product according to the present invention is shown in partial schematic cross-sectional view in FIG. 1. Roofing product 100 comprises a bituminous roofing substrate 110 having a top surface 112. The roofing product includes one or more (in this example, one) over-pressed zone 120, in which the roofing granules 182 are embedded in the bituminous roofing substrate substantially more deeply than in conventional granule-coated bituminous roofing products. In the embodiment of FIG. 1, the over-pressed zone extends substantially along the entire visible portion of the bituminous roofing substrate.

For example, in one aspect of the invention, the roofing granules in the one or more over-pressed zones are embedded in the bituminous roofing substrate so as to have 0.20 gram loss or less in a rub test as described in ASTM D 4977. Conventional commercially-available granule-coated roofing materials acceptably have a 0.5 gram loss in the rub test; values for commercially-available products are typically in the range of 0.3-0.7. In certain embodiments of the invention, the roofing granules in the one or more over-pressed zones are embedded in the bituminous roofing substrate so as to have 0.10 gram loss or less in a rub test as described in ASTM D 4977.

The ASTM D 4977 standard, entitled "Standard Test Method for Granule Adhesion to Mineral Surfaced Roofing by Abrasion is hereby incorporated herein by reference in its entirety. The rub test can be performed using a 3M Granule Adhesion Test Apparatus. The rub test measures granule loss after contact abrasion with a specified wire brush attached to a metal head of fixed weight with the brush in contact with the shingle top granule surface. There are 50 cycles to the test. One cycle is a forward and back motion. A pre-determined sample is weighed before and after the 50 cycles to determine any weight loss; higher loss values indicate relatively less degree of embodiment. The roofing industry specification has a maximum loss of 1 gram for 50 cycles.

Figure 2:
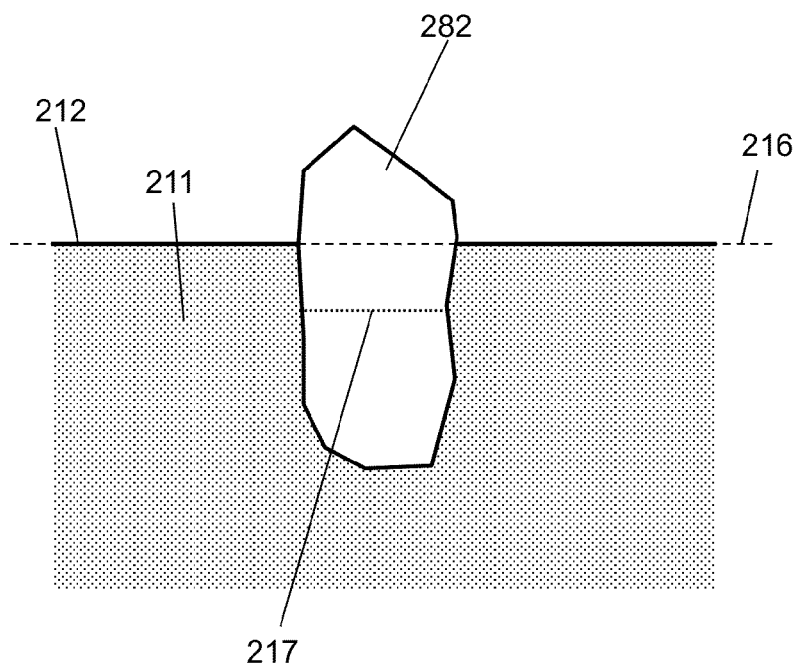
FIG. 2 is a close-up schematic cross-sectional view of an embedded granule in a roofing product according to one embodiment of the invention.

In another aspect of the invention, the roofing granules are embedded in the bituminous roofing substrate such that in the at least one over-pressed zone, the roofing granules are embedded so that the average granule embed volume fraction is at least 50%. FIG. 2 provides a close-up schematic cross-sectional view of an embedded granule. Granule 282 is embedded within bituminous material 211. The top surface 212 of the bituminous roofing substrate is demarcated by dashed line 216. A plane parallel to the surface of the bituminous roofing substrate that separates the top half of the granule from the bottom half of the granule by volume is demarcated by dotted line 217. Notably, the plane of half-volume is lower than the surface of the bituminous roofing substrate; accordingly, embed volume fraction for this particle is greater than 50%. According to this aspect of the invention, the average embed volume fraction over all granules in the at least one over-pressed zone is at least 50%. In certain embodiments, the granules are embedded even more deeply. Accordingly, in certain embodiments, the roofing granules in the over-pressed zone are embedded in the bituminous roofing substrate so that the average granule embed volume fraction is at least 70%. In one embodiment, the roofing granules in the over-pressed zone are embedded in the bituminous roofing substrate so that the average granule embed volume fraction is at least 85%. As the person of skill in the art will appreciate, any meniscus formed at the surface of the roofing granule is to be discounted in determining granule embed fraction.

In another aspect of the invention, the roofing granules are embedded in the bituminous roofing substrate such that in the at least one over-pressed zone, the average distance between the top of the roofing granules and the top surface of the bituminous roofing substrate is 1.0 mm or less. For example, in the roofing product shown in cross-sectional view in FIG. 5 and described in more detail below with reference to FIGS. 4 and 5, in over-pressed zone 420, the average distance between the top of the granules 484 and the surface of the bituminous material 412 in the over-pressed zone ("B") can be 1.0 mm or less. In certain embodiments, in the at least one over-pressed zone the average distance between the top of the roofing granules and the surface of the bituminous substrate is 0.75 mm or less, 0.5 mm or less, or even 0.2 mm or less. As the person of skill in the art will appreciate, any meniscus formed at the surface of the roofing granule is to be discounted in determining the distances described here.

Bituminous roofing substrates are generally familiar to the person of skill in the art. Bituminous roofing substrates are often provided in sheet form, as one or more layers of glass mat, felt or fabric impregnated with bituminous material such as asphalt. Notably, in certain embodiments (especially those in which the bituminous roofing substrate includes a glass mat), the person of skill in the art will ensure that the thickness of the bituminous material is thick enough so that the relatively deeply-embedded particles do not substantially contact the impregnated layers. The bituminous material can also or alternatively filled with fibrous or particulate matter, as is familiar to the person of skill in the art.

For example, in one embodiment, the bituminous roofing substrate is a bituminous roofing membrane, such as the type used in multiple layer or built-up roofing systems. In such embodiments, the bituminous roofing substrate can be provided, for example, as elongated sheets, which can be transported to the worksite in roll form. The roofing membrane can be, for example, formed from a bituminous material, and can be reinforced with fibers, glass mat, felt, or fabric. At least the top layer is coated with roofing granules as described herein. Installation of the membrane can be performed through a variety of mechanical fasteners, adhesives, torching, or any other suitable methods. Adjacent sheets of roofing membrane can be sealed together where they adjoin.

In another embodiment, the bituminous roofing substrate is a bituminous roofing shingle coated with roofing granules as described herein. Shingles can be manufactured, for example, using conventional methods, and cut into individual pieces. Shingles can be provided in bundles to a worksite, and can be installed using mechanical fasteners or other suitable methods. Adjacent courses of shingles can be applied in an overlapping manner to cover and protect the roof as is conventional.

Roofing granules are also familiar to the person of skill in the art. They can be, for example, ceramic-coated mineral particles, as are conventionally used in roofing applications. In certain embodiments, the roofing granules are of an average size of about 1-2 mm (e.g., about #11 mesh). The roofing granules can be, for example, the same type, color and distribution as those used in any inactive areas of the roofing substrate, so that any exposed receptor zones match the appearance of the rest of the substrate.

Of course, a variety of types of roofing granules may be used in practicing various aspects of the present invention. Roofing granules may be made from virtually any material that will withstand exposure to the environment without substantially degrading over a period of years, e.g., rock, mineral, gravel, sand, ceramic, or plastic. In certain embodiments of the invention, the granules are ceramic-coated mineral core particles optionally colored with metal oxides, such as those conventionally used on asphalt roofing shingles. The mineral core can consist of any chemically inert matter that can support a ceramic layer and has adequate mechanical properties. The mineral particles, which can be produced by a series of quarrying, crushing, and screening operations, are generally intermediate between sand and gravel in size (that is, between about 8 US mesh and 70 US mesh), and can, for example, have an average particle size of from about 0.2 mm to about 3 mm, and more preferably from about 0.4 mm to about 2.4 mm. In particular, suitably sized particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as recycled manufactured materials such as crushed bricks, concrete, porcelain, ceramic grog, ground recycled tires and fire clay.

Other materials, such as natural mineral manner (e.g., sand, crushed rock, and the materials listed above as suitable for the cores of coated granules), polymeric granules, and other synthetic materials can also be used. Polymeric materials, for example, can be provided with a variety of shapes (e.g., spherical, angular, sub-angular), which can contribute, in whole or in part, to the desired appearance.

In certain embodiments, the granules can be relatively plate-like in shape (e.g., having one dimension that is at least half of the other two dimensions) to provide for more uniform surface coverage. Such granules can be formed, for example, from slate. In certain embodiments, such granules can provide the desired distance between the tops of the granules and the bituminous substrate surface, without having to be deeply embedded into the bituminous material.

In certain embodiments, the granules are disposed on the bituminous roofing substrate in the one or more over-pressed (and/or in any standard-pressed zones) with surface fill factor of greater than about 60%. The surface fill factor is the fraction of the zone that is occluded by the granules, as measured in a direction normal to surface. Desirably, the granules have a surface fill factor of greater than about 75%. In certain desirable embodiments of the invention, the granules have a surface fill factor of greater than about 85%. Granule surface coverage can be measured using image analysis software, namely, Image-Pro Plus from Media Cybernetics, Inc., Silver Spring, Md. 20910. The shingle surface area is recorded in a black and white image using a CCD camera fitted to a microscope. The image is then separated into a bituminous coating portion and a granule covering portion using the threshold method in gray scale. The amount of granule coverage is then calculated by the image analysis software based upon the number of pixels with gray scale above the threshold level divided by the total number of pixels in the image. As the person of skill will recognize, in certain embodiments relatively high surface fill factors can be used across the entire roofing product, or in other embodiments, substantially only in the exposure area of the roofing product.

More than one type of granule can be used in the over-pressed zone. For example, a combination of larger (e.g., #11 mesh) and smaller (e.g., #18 or #22 mesh) granules can be used.

The roofing granules can, for example, be solar reflective granules. Solar-reflective granules can be used, for example, in areas of the roofing product that are to remain exposed to the atmosphere when a structure or device is adhered. The solar-reflective roofing granules can, for example, be coated over the entire exposed area of the roofing product, or alternatively only in the exposed area that is not to be covered with devices or structures, with the areas to be covered coated with less reflective roofing granules. The solar-reflective roofing granules can operate to reflect a portion of the solar radiation (e.g., in the infrared wavelengths) and thereby decrease the buildup of heat on the roof. The effective working temperatures of the roof can thereby be lowered, which can be advantageous in maintaining structures on the roof at a desirably low temperature. The solar-reflective roofing granules can be disposed on the bituminous roofing substrate in an amount sufficient to provide the zone so coated with a solar reflectivity greater than about 0.25. In one embodiment of the invention, the solar-reflective roofing granules have a solar reflectivity greater than about 0.3, or even greater than about 0.4. Solar-reflective roofing granules are described, for example, in U.S. Pat. No. 7,241,500, and U.S. Patent Application Publications nos. 2005/0072110 and 2009/0133738, each of which is hereby incorporated herein by reference in its entirety. In some embodiments, the top surface of the bituminous roofing substrate is not coated with solar-reflective granules in the one or more over-pressed zones (e.g., those that are to be covered by an element or structure), resulting in more economical use of solar reflective coating or solar reflective roofing granules. Similarly, in some embodiments, the solar reflective granules do not extend to areas of the roofing product which are not visible when installed (e.g., the headlap region of a shingle, or the selvage region of a roofing membrane).

Figure 3:
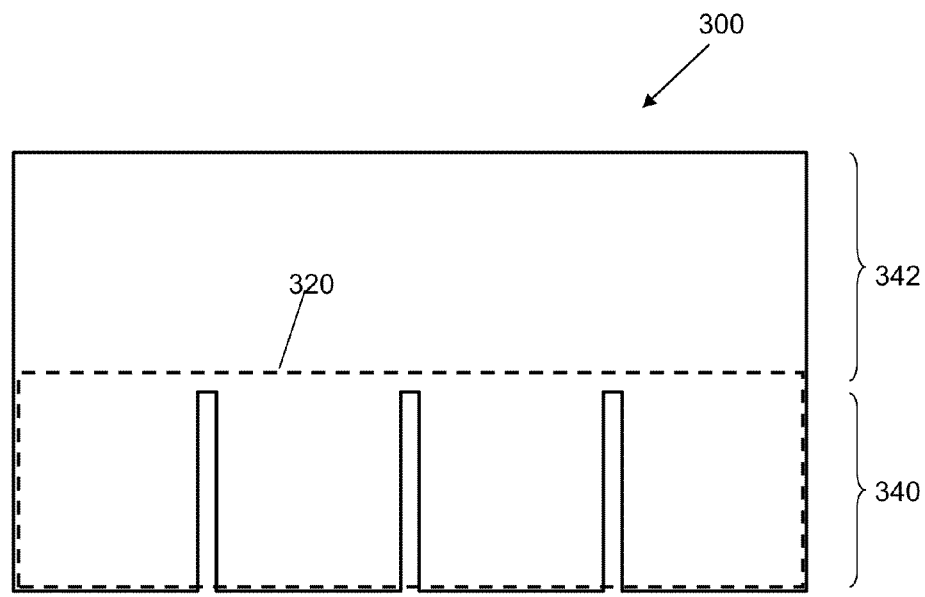
FIG. 3 is a top schematic view of a roofing product according to one embodiment of the invention.

The at least one over-pressed zone can be arranged on the bituminous roofing substrate in a variety of ways. For example, in one embodiment, an over-pressed zone can extend along substantially an entire top surface of the bituminous roofing substrate. In another embodiment, the top surface of the bituminous roofing substrate has an exposure area, and the over-pressed zone extends along substantially the entire exposure area. The exposure area is the area of the top surface of the bituminous roofing substrate that is exposed when the roofing substrate is installed. The dimensions of the exposure area will generally be evident to the person of skill in the art. For example, roofing shingles conventionally have a headlap region that is not to be exposed; the remainder of the shingle (e.g., including any tab-like structures) forms the exposure area. Roofing panels or membranes will tend to have relatively larger fractions of exposure area, as they are generally overlapped only along their edges. For example, in the roofing product 300 shown in top schematic view in FIG. 3 is a roofing shingle with four tabs. As the person of skill in the art would appreciate, the exposure zone 340 is the area that would be exposed when the roofing shingle is installed; the headlap zone 342 would be covered by overlying courses of shingles. An over-pressed zone 320 (i.e., in which the granules are relatively deeply embedded as described above) extends across the entire exposure area 342. The headlap area can be coated with standard-pressed granules, or alternatively no granules at all. Of course, the over-pressed zone can extend into the headlap area (e.g., as shown in FIG. 3).

Figure 4:
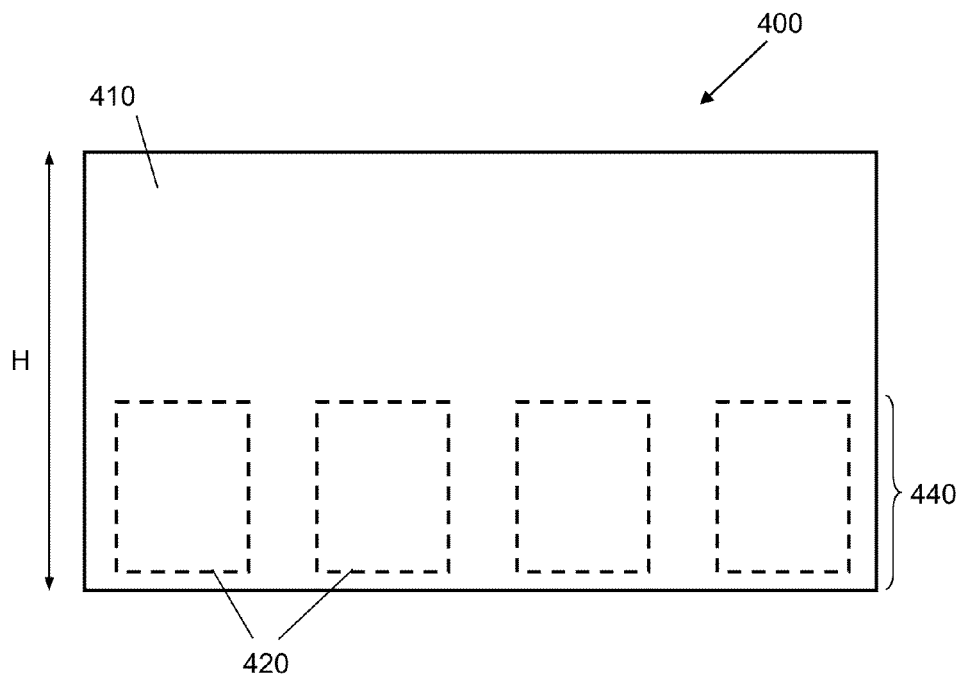
FIG. 4 is a top schematic view.
Figure 5:
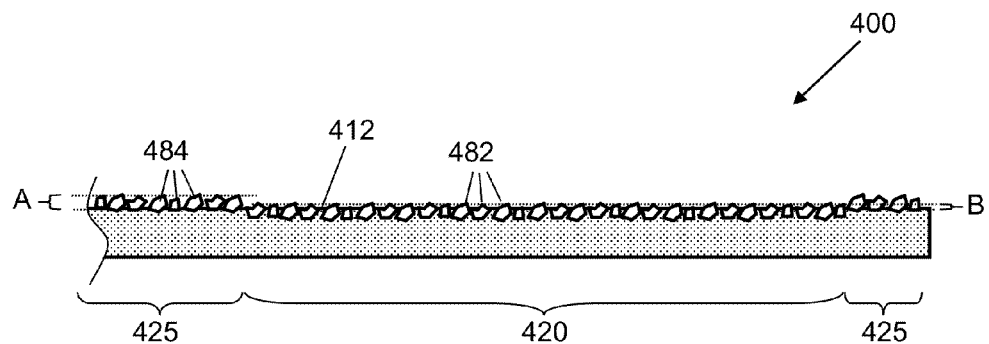
FIG. 5 is a cross-sectional schematic view of a roofing product according to another embodiment of the invention.

Another embodiment of a roofing product according to the present invention is shown in top schematic view in FIG. 4, and in schematic cross-sectional view in FIG. 5. Roofing product 400 comprises a bituminous roofing substrate 410 having a top surface 412 and an exposure area 440. One or more (in this embodiment, four) exposure over-pressed zones 420 are on the top surface 412 (in the exposure area 440) of bituminous roofing substrate 410. Adjacent to the over-pressed zones is a standard-pressed granule zone 425, in which the roofing granules 484 are embedded in the bituminous roofing substrate substantially less than the granules 482 in the over-pressed zones, as shown in FIG. 5. For example, as shown in FIG. 5 the average distance between the top of the granules 484 and the surface of the bituminous material can be substantially greater in the standard-pressed area ("A") than in the over-pressed zone ("B"). For example, in certain embodiments, the average granule embed fraction in the standard-pressed granule zone is substantially less than 50%. For example, the average granule embed fraction in the standard-pressed zone can be less than 45%, less than 40%, or even less than 30%. In other embodiments, the standard-pressed granules have a rub test loss of 0.3 or greater, or even 0.4 or greater. In other embodiments, in the at least one standard-pressed zone, the average distance between the top of the roofing granules and the top surface of the bituminous roofing substrate is substantially greater than 1.0 mm.

The sizes and shapes of the one or more over-pressed zones can, for example, be selected to be substantially similar to the sizes and shapes of the elements or structures that are to be adhered thereto. For example, as described in more detail below, in certain embodiments, photovoltaic elements are disposed in the over-pressed regions. Certain photovoltaic elements available from United Solar Ovonic have dimensions of about 12 cm×18 cm (T-Cells); about 24 cm×36 cm (L-Cells); or about 40 cm×5 m (strip). Of course, in other advantageous embodiments, the over-pressed zones need not be the same size or shape as the elements or structures to be adhered thereto. When the over-pressed zones are coated with granules that are of similar color and/or distribution as the granules in the standard-pressed regions, any over-pressed region that remains exposed will look similar to the standard-pressed regions.

In some embodiments of the invention, the granules in the one or more over-pressed zones are selected so that the appearance of the over-pressed zone is complementary to the top surface of the bituminous roofing substrate in the area adjacent to the over-pressed zone. As used herein L*, a* and b* are the color measurements for a given sample using the 1976 CIE color space. The strength in color space E* is defined as $E^*=(L^{*2}+a^{*2}+b^{*2})^{1/2}$. The total color difference $\Delta E^*$ between two articles is defined as $\Delta E^*=(\Delta L^{*2}+\Delta a^{*2}+\Delta b^{*2})^{1/2}$, in which $\Delta L^*$, $\Delta a^*$ and $\Delta b^*$ are respectively the differences in L*, a* and b* for the two articles. L*, a* and b* values are measured using a HunterLab Model Labscan XE spectrophotometer using a 0° viewing angle, a 45° illumination angle, a 10° standard observer, and a D-65 illuminant. Lower L* values correspond to relatively darker tones. In such embodiments, if part or all of a over-pressed zone is not covered by a element or structure adhered thereto, it can complement the rest of the surface of the bituminous roofing substrate. In certain embodiments of the invention, the over-pressed zone has a $\Delta E^*<30$ compared to the top surface of the bituminous roofing substrate in the area adjacent to the over-pressed zone. In some embodiments, the over-pressed zone has a $\Delta E^*<20$ (or even <10) compared to the top surface of the bituminous roofing substrate in the area adjacent to the over-pressed zone. For example, when the over-pressed zone is coated with granules as described above, they can be of similar color, type, and/or distribution as those used in the area adjacent to the over-pressed zone.

In some embodiments, the over-pressed zone has dimensions that are somewhat larger than (e.g., in the range of 101-120% of, or even 101-110% of) the dimensions of the elements or structures to be adhered thereto. Such embodiments can be more user-friendly, as precise alignment is not necessary for an installer to accurately place the element or structure completely within the over-pressed zone. In certain embodiments, when an elongated element is used, such as the photovoltaic strips available from United Solar Ovonic, minor angular misalignments can be tolerated. As described above, any visible over-pressed zone will look similar to the standard-pressed region when the over-pressed zones are coated with granules that are of similar color and/or distribution as the granules in the standard-pressed regions.

In the embodiment described above with respect to FIGS. 4 and 5, there is a discontinuity in the granule embed volume fraction at the border between the over-pressed area and the standard-pressed area. This discontinuity can provide a visible border between the zones. It can be a simple step, or formed as a bevel. In other embodiments, there can be a gradual transition between the over-pressed zone and the standard-pressed zone. For example, as defined herein the over-pressed zone is a zone in which the average granule embed fraction is at least 0.5 and/or the granules are embedded so as to have 0.20 gram loss or less in a rub test as described in ASTM D-4977.

The size of the over-pressed zone is at least about 5 cm², at least about 10 cm², or even at least about 100 cm².

The roofing products of the present invention can be advantageously used, for example, when it is desired to adhere something to the granule-coated surface in an over-pressed zone. For example, as described in more detail below, the roofing products described herein can have photovoltaic elements adhered in the over-pressed zones to form. Of course, other devices or structures can be adhered to the over-pressed zones as well. When the granules are embedded relatively deeply in the bituminous material as described herein, the bituminous material can more strongly interact with the materials of the device or structure to be adhered and/or an adhesive, providing a stronger bond than when the device/structure and/or adhesive substantially interacts only with the granules. This embodiment of the invention can be especially advantageous when used in conjunction with a pressure sensitive adhesive. Moreover, the reduced distance between the top of the granules and the top of the bituminous material can in many circumstances provide increased contact between an adhesive and the surface of the receptor zone (e.g., when the adhesive is not free-flowing).

In some embodiments of the invention, the surfacing of the one or more over-pressed zones includes one or more alignment marks (e.g., printed or embossed) to aid in the alignment and installation of an element or structure to be adhered thereon (e.g., a photovoltaic element). For example, the alignment marks can correspond with the visible separations between sets of photovoltaic cells in the photovoltaic element. In other embodiments, the alignment marks can correspond with markings formed on the top surface and/or the bottom surface (e.g., the bottom surface of an adhesive layer) of the element or structure. In other embodiments, the alignment marks can correspond to markings formed on a surface of a releasable liner on an element or structure to be adhered (e.g., the surface in contact with an adhesive layer, or the bottom surface); as the releasable liner is removed to expose the adhesive layer (e.g., when the photovoltaic element is supplied in roll form), the installer can use it as a guide to ensure alignment of the element or structure to the over-pressed zone. The use of alignment marks can be especially useful when using photovoltaic elements in strip form, as the potential for alignment is higher for long, thin strips (e.g., United Solar Ovonic strip photovoltaic element). The use of alignment marks in the over-pressed zone can be especially useful when the element or structure is smaller than the over-pressed zone, so that the alignment marks are visible when the element or structure is disposed thereon.

In other embodiments, the roofing product includes one or more alignment marks (e.g., printed or embossed) in the area adjacent the over-pressed zone to aid in the alignment and installation of a element or structure to be adhered thereto. The alignment marks can be as described above for the alignment marks in the over-pressed zone. For example, the alignment marks can correspond with the visible separations between sets of photovoltaic cells in a photovoltaic element. In other embodiments, the alignment marks can correspond with markings formed on the top surface of the element or structure to be adhered.

Figure 6:
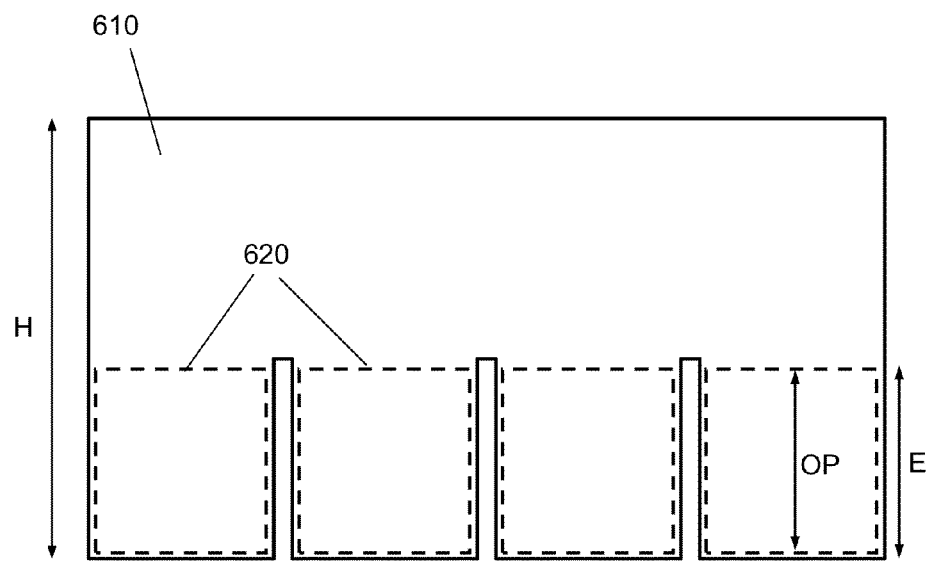
FIG. 6 is a top schematic view of a roofing product according to another embodiment of the invention.
Figure 12:
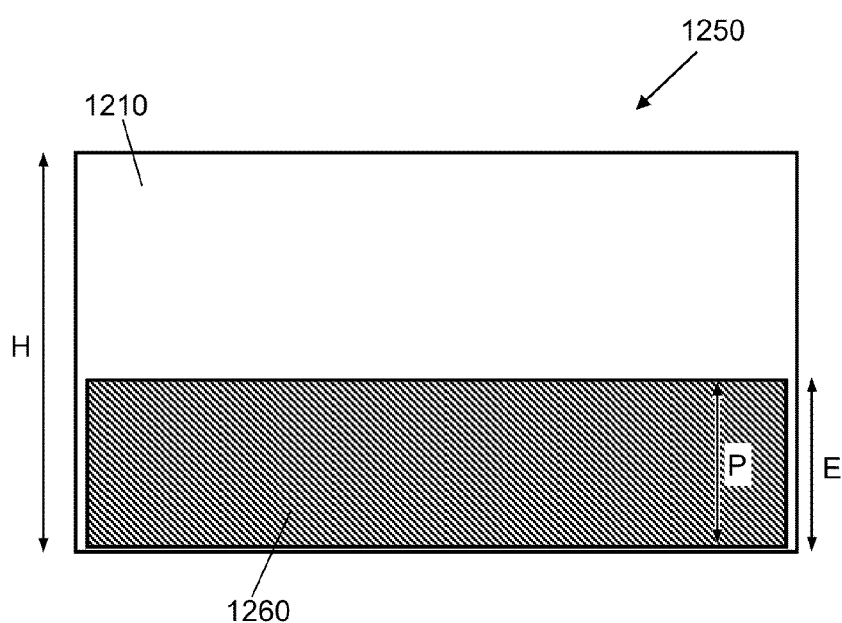
FIG. 12 is a schematic top view of a photovoltaic roofing element according to another embodiment of the invention.

In certain embodiments, the bituminous roofing substrate has a height (i.e., measured in the direction going up the roof as installed) of about eighteen inches (for example, in the range of 17 inches to 19 inches, in the range of 17.5 inches to 18.5 inches, or even in the range of 17.7 inches to 18.3 inches). One such embodiment is shown in FIG. 6; bituminous roofing substrate 610 is a shingle having four over-pressed zones 620 a height "H" of about 18 inches. For example, a shingle dimension of 18"×36" can be used. In certain embodiments, the bituminous roofing substrate can have an exposure area (i.e., the area exposed as installed) having exposure height (i.e., height of the exposed area as installed, shown as "E" in FIG. 6) of about eight inches (for example, in the range of 7 inches to 9 inches, in the range of 7.5 inches to 8.5 inches, or even in the range of 7.7 inches to 8.3 inches). The bituminous roofing substrate can, for example, be a shingle having multiple tabs in its exposure area, as shown in FIG. 6, or can be substantially continuous. As the person of skill in the art will appreciate, the shingle can be of single- or multiple layer construction. In certain embodiments, the one or more over-pressed zones of the bituminous roofing substrate area are disposed substantially within the exposure area. The one or more over-pressed zones can have a height (shown as "OP" in FIG. 12) of about eight inches (for example, in the range of 7 inches to 9 inches, in the range of 7.5 inches to 8.5 inches, or even in the range of 7.7 inches to 8.3 inches). In certain embodiments, the over-pressed zone has a height that is slightly less than or equal to (e.g., in the range of zero to one inch, in the range of zero to 0.5 inches, or even in the range of 0 to 0.3 inches less than) the height of the exposure area.

The use of bituminous roofing substrates having heights of about eighteen inches, optionally with exposure heights of about eight inches and/or over-pressed zones having heights of about eight inches can result in a number of advantages. For example, such configurations can result in desirable natural-appearing effects, similar to those of certain standard roofing shingles. Moreover, these configurations can require relatively few nails per square of roofing material, require the installation of relatively few roofing elements per square of roofing material, result in material and labor savings, allow for the ready manufacture of bituminous roofing substrates from sheets of material that are originally about 36 inches wide, and result in efficient loading on standard 36 inch pallets. Moreover, use of exposure areas and/or over-pressed zones having heights of about eight inches can result in more efficient use of photovoltaic elements, as compared to systems based on standard roofing elements having a twelve inch height and an exposure area having a height of five inches, as fewer individual photovoltaic elements are required to outfit an equivalent roof area. Similarly, less time can be spent installing and wiring photovoltaic elements as compared to systems based on standard roofing elements having a twelve inch height and an exposure area having a height of five inches, as fewer photovoltaic elements would need to be installed and fewer wiring connections would need to be made per unit area. Use of roofing elements having heights of about eighteen inches, exposure zones having heights of about eight inches, and/or over-pressed zones having heights of about eight inches, as described above, and/or photovoltaic elements having heights of about eight inches, as described in more detail below, can advantageously be used in conjunction with any appropriate embodiments described herein.

In various embodiments of the invention, the roofing product is in shingle form. Shingles can, for example, be provided in product constructions that have a single layer of bituminous shingle material. In other embodiments, multilayer laminated shingle constructions can be used. Laminated shingles can provide for a wide range of aesthetic effects in shingle design, as well as provide space within the shingle to accommodate wiring and electrical connector structures. Laminated shingles can yield a flatter laying product without undesirable bumps when installed.

Figure 7:
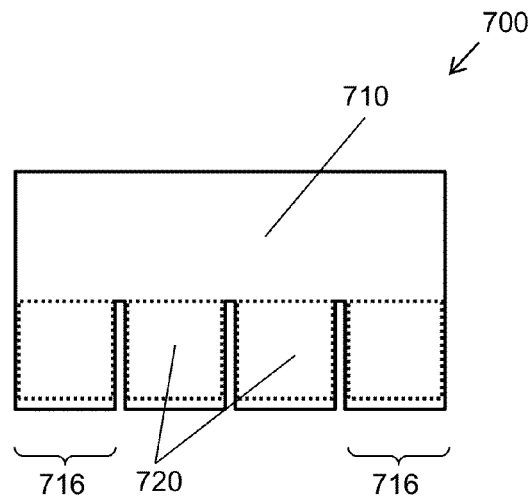
FIGS. 7, 8 and 9 are top schematic views of roofing products according to additional embodiments of the invention.
Figure 8:
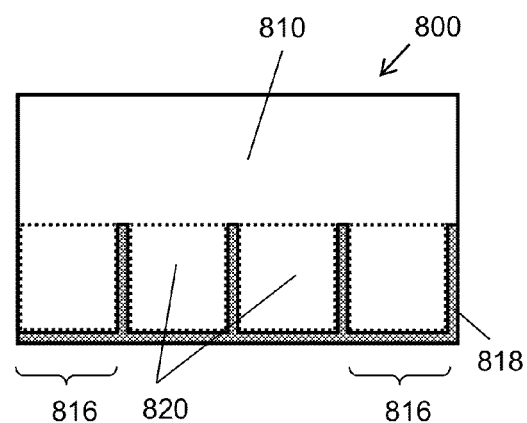
Figure 9:
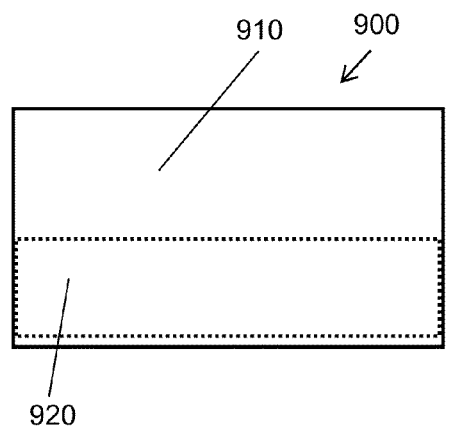

For example, in the roofing product 700 of FIG. 7, shingle 710 has four tab areas 716, each having a receptor zone 720 formed thereon, on which a photovoltaic element can be disposed. In the roofing product 800 of FIG. 8, shingle 810 has four tab areas 816, each having a receptor zone 820 formed thereon. Roofing product 800 also includes a backing shim 818 (i.e., a second thickness of shingle material) laminated to the bottom of shingle 810. The backing shim can provide an aesthetic effect delineating the tabs and create the illusion of shadows and structure, as well as well as providing another layer of material to cover a roof. The backing shim can underlay the entire shingle, or alternatively can underlay only part of the shingle. In other embodiments, as in the roofing product 900 shown in FIG. 9, the shingle 910 need not have any individual tabs, and can have a single receptor zone 920 formed thereon. The receptor zone(s) can be formed to cover the entire exposure area of the shingle. In other embodiments, roofing granules (e.g., colored and/or solar reflective) can be disposed on exposed areas of the shingle. Lower cost granules can be used in the headlap zones that would be covered when the shingle is installed on a roof.

Standard techniques can generally be used to make the roofing products described herein. The granules can be coated onto bituminous roofing substrates using standard techniques, controlling the distance between the granule press and the bituminous roofing substrate to provide a desired embed volume. The granules in the receptor zones can be pushed more deeply into the bituminous material in the granule coating process, for example, by first coating both the standard-pressed areas and the over-pressed zones with granules as is conventional, then, while the bituminous material is still soft, pushing the granules down farther only in the over-pressed zones. The second pressing operation can also be performed with a separate heating of the substrate to soften the bituminous material. Alternatively, a granule press with the desired surface relief can be used in the initial coating process.

Figure 10:
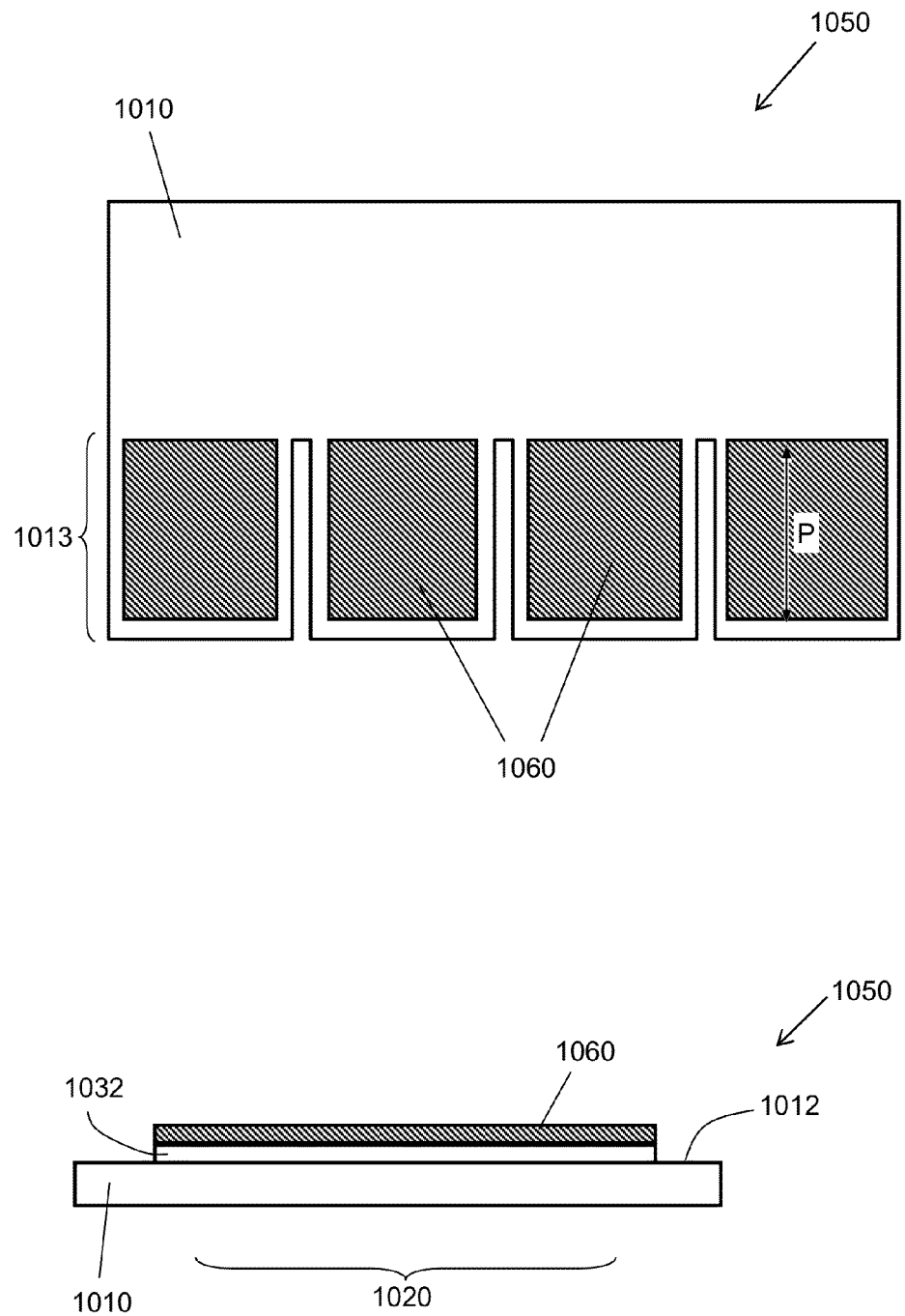
FIG. 10 is a top schematic view and a cross-sectional schematic view of a photovoltaic roofing element according to one embodiment of the invention.

Another aspect of the invention is a roofing element comprising a roofing product as described above, and an element or structure adhered to the roofing product in a over-pressed zone. One embodiment is shown in schematic top perspective view and in partial (i.e., of a single tab) schematic cross-sectional view in FIG. 10. Roofing element 1050 includes a bituminous roofing substrate 1010 having a top surface 1012, the top surface having an exposure zone 1013 having one or more (in this example, four) over-pressed zones 1020 thereon (i.e., one on each tab), as described above. Roofing element 1050 further comprises one or more elements or structures 1060 disposed in the one or more over-pressed zones of the top surface of the bituminous roofing substrate. The one or more elements or structures can be adhered to the top surface of the bituminous roofing substrate (i.e., on the granules) in the over-pressed zones as described above. For example, as shown in FIG. 10, a tie layer system (e.g., adhesive material) 1032 can adhere each element or structure 1060 to the top surface 1012 of bituminous roofing substrate 1010 in over-pressed zones 1020. In other embodiments, a material of the element or structure itself can be used to adhere it to the over-pressed zone. For example, a element or structure with a thermoplastic bottom surface can in some embodiments be heated and applied to the over-pressed area.

For example, in certain embodiments, one or more photovoltaic elements can be adhered to the roofing product in the over-pressed zone. Accordingly, one aspect of the invention is a photovoltaic roofing substrate comprising a roofing product as described above, and one or more photovoltaic elements adhered to the roofing product in its one or more over-pressed zone.

Photovoltaic elements suitable for use in conjunction with the roofing products of the invention, and in the photovoltaic roofing elements, systems, methods and kits of the invention comprise one or more interconnected photovoltaic cells provided together in a single package. The photovoltaic cells of the photovoltaic elements can be based on any desirable photovoltaic material system, such as monocrystalline silicon; polycrystalline silicon; amorphous silicon; III-V materials such as indium gallium nitride; II-VI materials such as cadmium telluride; and more complex chalcogenides (group VI) and pnicogenides (group V) such as copper indium diselenide. For example, one type of suitable photovoltaic cell includes an n-type silicon layer (doped with an electron donor such as phosphorus) oriented toward incident solar radiation on top of a p-type silicon layer (doped with an electron acceptor, such as boron), sandwiched between a pair of electrically-conductive electrode layers. Another type of suitable photovoltaic cell is an indium phosphide-based thermo-photovoltaic cell, which has high energy conversion efficiency in the near-infrared region of the solar spectrum. Thin film photovoltaic materials and flexible photovoltaic materials can be used in the construction of photovoltaic elements for use in the present invention. In one embodiment of the invention, the photovoltaic element includes a monocrystalline silicon photovoltaic cell or a polycrystalline silicon photovoltaic cell. The photovoltaic elements for use in the present invention can be flexible, or alternatively can be rigid.

The photovoltaic elements can be encapsulated photovoltaic elements, in which photovoltaic cells are encapsulated between various layers of material. For example, an encapsulated photovoltaic element can include a top layer material at its top surface, and a bottom layer material at its bottom surface. The top layer material can, for example, provide environmental protection to the underlying photovoltaic cells, and any other underlying layers. Examples of suitable materials for the top layer material include fluoropolymers, for example ETFE ("TEFZEL"), PFE, FEP, PVF ("TEDLAR"), PCTFE or PVDF. The top layer material can alternatively be, for example, a glass sheet, or a non-fluorinated polymeric material. The bottom layer material can be, for example, a fluoropolymer, for example ETFE ("TEFZEL"), PFE, FEP, PVDF or PVF ("TEDLAR"). The bottom layer material can alternatively be, for example, a polymeric material (e.g., polyester such as PET); or a metallic material (e.g., steel or aluminum sheet). In certain embodiments of the invention, the photovoltaic element is built on a flexible steel substrate, as described, for example, in U.S. Pat. No. 5,457,057, which is hereby incorporated by reference in its entirety. In such embodiments, the photovoltaic cells can be formed from amorphous silicon.

Figure 11:
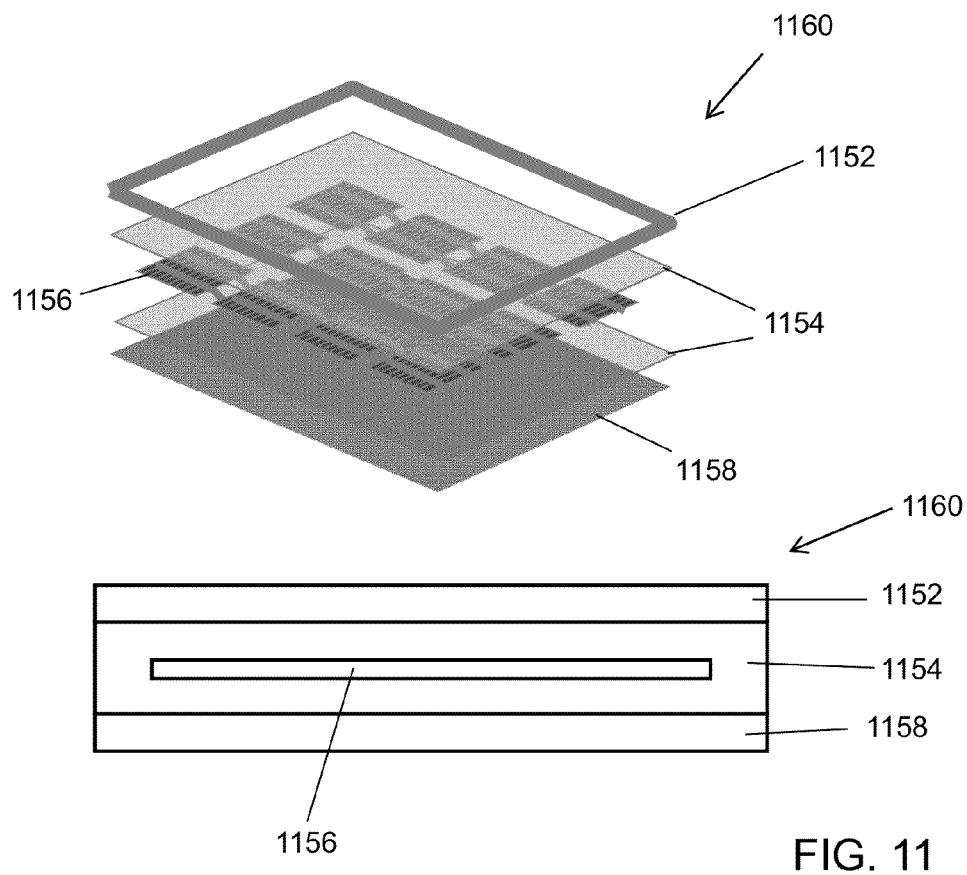
FIG. 11 is a schematic exploded view and schematic cross sectional view of an example of an encapsulated photovoltaic element suitable for use in certain aspects of the present invention.

As the person of skill in the art will appreciate, an encapsulated photovoltaic element can include other layers interspersed between the top layer material and the bottom layer material. For example, an encapsulated photovoltaic element can include structural elements (e.g., a reinforcing layer of glass, metal or polymer fibers, or a rigid film); adhesive layers (e.g., EVA to adhere other layers together); mounting structures (e.g., clips, holes, or tabs); one or more electrical connectors (e.g., electrodes, electrical connectors; optionally connectorized electrical wires or cables) for electrically interconnecting the photovoltaic cell(s) of the encapsulated photovoltaic element with an electrical system. An example of an encapsulated photovoltaic element suitable for use in certain aspects of the present invention is shown in schematic exploded view and schematic cross sectional view in FIG. 11. Encapsulated photovoltaic element 1160 includes a top protective layer 1152 (e.g., glass or a fluoropolymer film such as ETFE, PVDF, PVF, FEP, PFA or PCTFE); encapsulant layers 1154 (e.g., EVA, functionalized EVA, crosslinked EVA, silicone, thermoplastic polyurethane, maleic acid-modified polyolefin, ionomer, or ethylene/(meth)acrylic acid copolymer); a layer of electrically-interconnected photovoltaic cells 1156; and a backing layer 1158 (e.g., PVDF, PVF, PET).

A photovoltaic element having a self-adhesive layer on its bottom surface can be suitable for use in the present invention (e.g., it can be adhered in the over-pressed zone). In one example, the self-adhesive layer is a 3-10 mil thick layer of a butyl rubber-based or rubber resin pressure sensitive adhesive. Suitable rubber resin pressure sensitive adhesives are disclosed, for example, in U.S. Pat. No. 3,451,537, which is hereby incorporated herein by reference in its entirety. Other photovoltaic elements and adhesive systems suitable for use in the present invention are described in U.S. Pat. Nos. 6,729,081 and 6,553,729, each of which is hereby incorporated herein by reference in its entirety. In certain embodiments, the adhesive package on the bottom surface of the photovoltaic element has a composite structure comprising a layer of pressure sensitive adhesive and a layer of deformable material. The deformable material can allow for more economical usage of a higher performance, higher cost pressure sensitive adhesive. The use of deformable layers to improve contact between pressure sensitive adhesives and irregular surfaces is disclosed in U.S. Pat. No. 5,310,278, which is hereby incorporated herein by reference in its entirety. The self-adhesive layer can be protected with a releasable liner; the releasable liner can be removed (e.g., by peeling) to expose the adhesive for attachment to the over-pressed zone of a roofing product.

The photovoltaic element can include at least one antireflection coating, for example as the top layer material in an encapsulated photovoltaic element, or disposed between the top layer material and the photovoltaic cells. In other embodiments, the photovoltaic element can include, for example, a lenticular element, such as that described in WO 2007/085721, which is hereby incorporated herein by reference in its entirety; or a decorative and/or colored overlay, such as that described in U.S. Patent Application Publication no. 2009/0000221, which is hereby incorporated herein by reference in its entirety.

Suitable photovoltaic elements can be obtained, for example, from China Electric Equipment Group of Nanjing, China, as well as from several domestic suppliers such as United Solar Ovonic, Sharp, Shell Solar, BP Solar, USFC, FirstSolar, General Electric, Schott Solar, Evergreen Solar and Global Solar. Moreover, the person of skill in the art can fabricate encapsulated photovoltaic elements using techniques such as lamination or autoclave processes. Encapsulated photovoltaic elements can be made, for example, using methods disclosed in U.S. Pat. No. 5,273,608, which is hereby incorporated herein by reference.

The top surface of a photovoltaic element is the surface presenting the photoelectrically-active areas of its one or more photoelectric cells. When installed, the photovoltaic roofing elements of the present invention should be oriented so that the top surface of the photovoltaic element is able to be illuminated by solar radiation. The bottom surface is the surface opposite the top surface.

The photovoltaic element also has an operating wavelength range. Solar radiation includes light of wavelengths spanning the near UV, the visible, and the near infrared spectra. As used herein, the term "solar radiation," when used without further elaboration means radiation in the wavelength range of 300 nm to 2500 nm, inclusive. Different photovoltaic elements have different power generation efficiencies with respect to different parts of the solar spectrum. Amorphous doped silicon is most efficient at visible wavelengths, and polycrystalline doped silicon and monocrystalline doped silicon are most efficient at near-infrared wavelengths. As used herein, the operating wavelength range of a photovoltaic element is the wavelength range over which the relative spectral response is at least 10% of the maximal spectral response. According to certain embodiments of the invention, the operating wavelength range of the photovoltaic element falls within the range of about 300 nm to about 2000 nm. In certain embodiments of the invention, the operating wavelength range of the photovoltaic element falls within the range of about 300 nm to about 1200 nm.

As described above, the roofing product can have solar reflective properties, e.g., through use of solar reflective roofing granules (see U.S. Pat. No. 7,241,500, which is hereby incorporated by reference in its entirety). Solar reflectance can reduce the effective temperature of the roof surface, which can improve the efficiency of power generation of the photovoltaic elements disposed thereon, as described in U.S. Patent Application Publication no. 2009/0133738, which is hereby incorporated herein by reference in its entirety.

In certain embodiments of the photovoltaic roofing elements as described herein, the exposure area has a height of about eight inches, the photovoltaic elements each have a height of about eight inches, and/or the roofing element has a height of about eighteen inches. An example of such a photovoltaic roofing element is shown in top schematic view in FIG. 12. Photovoltaic roofing element 1250 includes a bituminous roofing substrate 1210, which has a height "H" of about 18" (e.g., in the range of 17 inches to 19 inches, in the range of 17.5 inches to 18.5 inches, or even in the range of 17.7 inches to 18.3 inches), and a top surface having an exposure area of height "E" of about eight inches (e.g., in the range of 7 inches to 9 inches, in the range of 7.5 inches to 8.5 inches, or even in the range of 7.7 inches to 8.3 inches). Disposed in the exposure area (i.e., in an over-pressed zone) is photovoltaic element 1260 having a height "P" of about eight inches (e.g., in the range of 7 inches to 9 inches, in the range of 7.5 inches to 8.5 inches, or even in the range of 7.7 inches to 8.3 inches). Of course, in other embodiments, the photovoltaic roofing element can be built with "tabs," as is conventional in the art and shown in FIG. 10, or in some other configuration.

Figure 13:
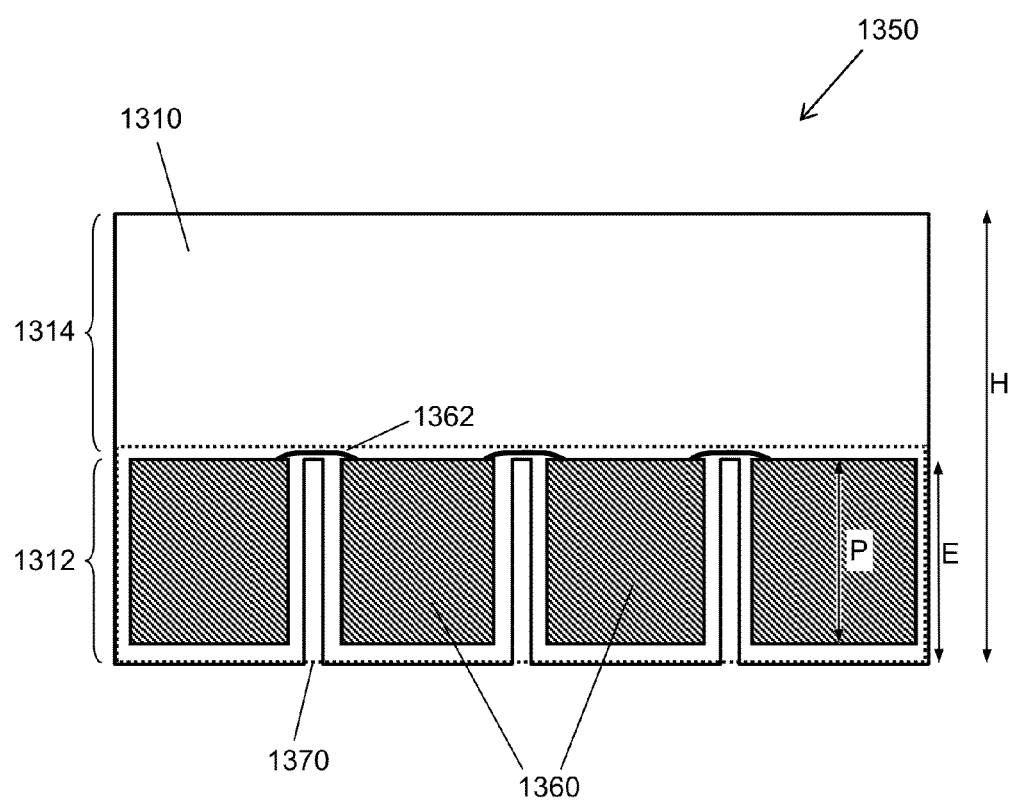
FIG. 13 is a schematic top view of a photovoltaic roofing element according to another embodiment of the invention.

For example, another embodiment of the invention is shown in top schematic view in FIG. 13. Photovoltaic roofing element 1350 includes a roofing product 1310, having an overall height "H", an exposure area 1312 having a height "E", and a headlap area 1314. One or more photovoltaic elements 1360, having height "P" are disposed in the exposure area (i.e., in an over-pressed region). The photovoltaic elements 1360 can be interconnected, for example, by jumper wires 1362. The photovoltaic roofing element can have electrodes on its bottom surface for interconnection into a larger electrical system; alternatively, one or more optionally connectorized input/output cables can be used to collect the energy generated by the photovoltaic element(s). The photovoltaic roofing element also includes an encapsulant layer 1370 disposed over the exposure area, covering both the photovoltaic elements and the exposed inactive regions of the exposure area. The encapsulant layer can be embossed in the inactive regions so that the roofing substrate is visible. The encapsulant layer can be, for example, a fluoropolymer such as an ethylene-tetrafluoroethylene copolymer (e.g., TEFZEL), and can be bound to rest of the device with a layer of poly(ethylene-co-vinyl acetate). The encapsulant layer can optionally extend into the overlap area. Similar devices are described in more detail in U.S. Pat. Nos. 5,575,861 and 5,437,735, each of which is hereby incorporated herein by reference in its entirety. In the devices described therein, for example, the distance $W_T$ can be about eight inches, as described above, and/or the distance $W_S$ can be about eighteen inches, as described above. In certain such devices, no actual cut-out tabs are provided on the roofing substrate; rather the encapsulant was embossed between laterally adjacent photovoltaic elements to simulate the appearance of tabs. Notably, according to the present invention, such devices can be formed with roofing substrates having height "H" of about eighteen inches, as described above. Moreover, according to the present invention, such devices can be formed with roofing substrates having exposure area height "E" of about eight inches, and/or photovoltaic elements having height "P" of about eight inches, as described above.

In certain embodiments, the roofing product of the photovoltaic roofing element has a height of about eighteen inches. In certain such embodiments, the roofing product has an exposure area having an exposure height of about eight inches, as described above; one or more over-pressed zones having a height of about eight inches, as described above; or both. The photovoltaic element can similarly have a height (measured in the direction going up the roof as installed) of about eight inches (for example, in the range of 7 inches to 9 inches, in the range of 7.5 inches to 8.5 inches, or even in the range of 7.7 inches to 8.3 inches). The use of photovoltaic elements having heights of about eight inches can result in more efficient use of photovoltaic elements, as compared to systems based on standard roofing elements having a twelve inch height and an exposure area having a height of five inches, as fewer photovoltaic elements are required to outfit an equivalent roof area. Similarly, less time can be spent installing and wiring photovoltaic elements as compared to systems based on standard roofing elements having a twelve inch height and an exposure area having a height of five inches, as fewer photovoltaic elements would need to be installed and fewer wiring connections would need to be made per unit area. Moreover, shingles substantially larger than eighteen inches in height can be difficult for a single worker to handle on the roof with any wind present. Similarly, photovoltaic elements eight inches in height (especially in roll form) can be of a convenient size for handling on a roof, especially on a pitched roof where balance can be difficult making larger photovoltaic elements unwieldy. Moreover, photovoltaic elements having a height of about eight inches can be conveniently fabricated from a roll of flexible steel material (see, e.g., U.S. Pat. No. 5,457,057) having a width of about 15 inches; amorphous silicon-based cells can be deposited onto the flexible steel material, which can be cut lengthwise into about 7.5 inch wide strips, which when packaged and encapsulated can be about eight inches in height. Accordingly, photovoltaic elements about eight inches in height can efficiently use the entire width of the 15 inch flexible steel substrate commonly used in the fabrication of photovoltaic devices.

Of course, in other embodiments, other shingle sizes can be used, such as a shingles having 12 inch height and 5 inch exposure area; shingles having 13¼ inch height and 5⅝ inch exposure area, or shingles having 16 inch height and seven inch exposure area.

In another aspect of the invention, a photovoltaic roofing system comprises one or more photovoltaic roofing elements as described herein disposed on a roof deck. The photovoltaic roofing elements can be disposed with a certain amount of overlap to provide a waterproof covering, as is conventional in the roofing arts. The photovoltaic roofing system can include a wiring system as described above, and as described in U.S. Patent Application Publication no. 2008/0271774 A1, which is hereby incorporated herein by reference in its entirety. The photovoltaic elements of the photovoltaic roofing elements are desirably connected to an electrical system, either in series, in parallel, or in series-parallel, as would be recognized by the skilled artisan. Electrical connections can be made using electrical connectors, such as those available from Tyco International, and those described in U.S. Patent Application Publication no. 2010/0105238, which is hereby incorporated herein by reference in its entirety. There can be one or more layers of material, such as underlayment, between the roof deck and the photovoltaic roofing elements of the present invention. The photovoltaic roofing elements of the present invention can be installed on top of an existing roof; in such embodiments, there would be one or more layers of standard (i.e., non-photovoltaic) roofing elements (e.g., asphalt coated shingles or membrane roofing) between the roof deck and the photovoltaic roofing elements of the present invention. Electrical connections are desirably made using cables, connectors and methods that meet UNDERWRITERS LABORATORIES and NATIONAL ELECTRICAL CODE standards. Even when the photovoltaic roofing elements of the present invention are not installed on top of preexisting roofing materials, the roof can also include one or more standard roofing elements, for example to provide weather protection at the edges of the roof, or in any hips, valleys, and ridges of the roof, or in areas not suitable for photovoltaic power generation.

In certain photovoltaic elements of the invention, at least about 70%, at least about 80%, or even at least about 90% of the total exposed over-pressed zone area of a roofing product is covered by photovoltaic elements.

In certain photovoltaic roofing systems of the invention, at least about 70%, at least about 80%, or even at least about 90% of the total exposed over-pressed zone area of the roofing products is covered by photovoltaic elements.

A tie layer system can be used to adhere the element or feature (e.g., photovoltaic elements) in the over-pressed zone of the roofing product, as described in U.S. Patent Application Publication no. 2009/0133340 A1, which is hereby incorporated herein by reference in its entirety. The tie layer system can in certain embodiments include layers that are provided together with the element or feature. For example, when the tie layer system is a layer of adhesive material, it can be provided as a layer of adhesive on the bottom of the element or feature (e.g., exposed by removing a release liner); or both.

In certain embodiments of the invention, the tie layer system is a polymeric tie layer system (i.e., it comprises one or more polymer layers). For example, in one embodiment of the invention, the tie layer system consists of a single polymer layer. In other embodiments of the invention, the tie layer system consists of a plurality of polymer layers. For example, a tie layer system can include an adhesive layer and a reinforcing layer and/or a surface activation layer. Yet in another example, the tie layer system can comprise other layers of structural features, such as woven or nonwoven mat, a fibrous surface, a patterned surface, a nano-structured surface, or blends of various materials to improve the bonding. In some embodiments, the tie layer system has a stratified structure, for example having an upper surface and a lower surface, each of which has different surface chemistry. For example, each surface can be adapted to adhere to a different adherend.

Especially suitable tie layer systems provide sufficient bond strength to join the bottom surface of the element or feature (e.g., photovoltaic element) to the top surface of the bituminous roofing substrate, and should be able to withstand severe outdoor weathering. In one embodiment of the invention, the tie layer system provides greater than 10 lb/inch adhesive bond strength in a 90° peel test. In certain embodiments, the tie layer system maintains the bond strength in severe outdoor conditions for an extended period of time, e.g., 20 years of service life. The tie layer system can, for example, meet the humidity-freeze cycle test, thermal cycle test, and damp-heat test requirements listed in IEC 1646. Moreover, in certain embodiments the materials of the tie layer system can flexibly be incorporated through use of a variety of adhesive processes.

A polymeric tie layer system can act to adhere the element or feature (e.g., photovoltaic element) to the bituminous roofing substrate, especially when they are formed of partially incompatible materials (for example, when the photovoltaic element is an encapsulated photovoltaic element having a fluoropolymer at its bottom surface). In one embodiment of the invention, the tie layer system consists of a single polymer layer having a surface tension in the range of about 25% to about 75% of the way between the surface tension value of the top surface of the roofing element and the surface tension value of the bottom surface of the element or feature.

In one embodiment of the invention, the tie layer system includes a polymeric material having a Chang viscoelastic window exhibiting at least one set of coordinates (log(G"), log(G')) lying within the window bound by the coordinates (4.5, 3), (4.5, 6), (6, 6), (6, 3) (e.g., pressure sensitive adhesives). In certain embodiments of the invention, the polymeric material has a Chang viscoelastic window exhibiting at least one set of coordinates (log(G"), log(G')) lying within the window bound by the coordinates (4.5, 6), (6, 6), (6, 3.7). In other embodiments of the invention, the polymeric material has a Chang viscoelastic window exhibiting at least one set of coordinates (log(G"), log(G')) lying within the window bound by the coordinates (4.5, 6), (4.5, 8), (8, 8), (8, 3.7), (6, 3.7). In other embodiments of the invention, the polymeric material has a Chang viscoelastic window exhibiting at least one set of coordinates (log(G"), log(G')) lying within the window bound by the coordinates (4.5, 6), (4.5, 8), (8, 8), (8, 3.7), (6, 3.7), (6, 6). G" is the viscous shear modulus in units of Pa, and G' is the elastic shear modulus in units of Pa. G and G" can be measured as described in ASTM 882-97, for example at frequencies of 0.01 R/S and 100 R/S. Dissipative materials generally have Chang viscoelastic window coordinates within the above-referenced windows. Such materials are described in more detail in U.S. Pat. No. 6,869,981, and at pages 171-184 of Handbook of Pressure Sensitive Adhesive Technology, 3rd Ed., D. Satas editor, 1999, each of which is hereby incorporated herein by reference in its entirety; the UV curable materials described therein can be converted to heat-curable materials by changing initiators. Other examples include VHB adhesive materials available from 3M.

In certain embodiments of the invention, the tie layer system has a coefficient of thermal expansion ("CTE") between the CTE of the top surface of the bituminous roofing substrate and the CTE of the bottom surface of the element or feature (e.g., photovoltaic element), measured at 100° F. In one embodiment of the invention, the tie layer system has a CTE in the range of about 25% to about 75% of the way between the CTE of the top surface of the bituminous roofing substrate and the CTE of the bottom surface of the element or feature (e.g., photovoltaic element), measured at 100° F. In one embodiment of the invention, the top surface of the bituminous roofing element has a CTE of $\sim 2.5\times 10^{-4}$ in/in/° F.

In certain embodiments of the invention, the tie layer materials are not conductive. In such embodiments, the photovoltaic elements do not require additional grounding to prevent electric shock or to meet electrical code requirements.

In some embodiments of the invention, the tie layer system can include one or more materials selected from the group consisting of a polyolefin functionalized with carboxylate and/or anhydride (e.g., maleic anhydride); ethylene vinyl acetate (optionally modified with anhydride); acid-modified polyolefins (e.g., ethylene/(meth)acrylic acid); a combination of an acid-modified polyolefin with an amine-functional polymer; maleic anhydride-grafted EPDM; a hot melt containing a thermoplastic or elastomeric fluoropolymer; and a curable resin (e.g., an epoxy resin such as BondiT from Reltek LLC, or an ethylenically-unsaturated resin), butyl adhesives, or pressure-sensitive adhesives. Examples of such materials are described, for example, in U.S. Pat. Nos. 6,465,103; 6,632,518; 7,070,675; 6,524,671; 5,143,761; and 6,630,047, each of which is hereby incorporated herein by reference in its entirety.

In other embodiments of the invention, the tie layer system comprises an amino-substituted organosilane layer, for example as described in U.S. Pat. No. 6,753,087, which is hereby incorporated herein by reference. For example, the tie layer system can comprise a polymeric layer (e.g., having polar functionality) having blended therein an amino-substituted organosilane.

The thickness of the tie layer system can be, for example, in the range of about 25 μm to about 2.5 mm. In certain embodiments of the invention, the thickness of the tie layer system is in the range of about 50 μm to about 1 mm.

Examples of various processes for completing the bonding of the tie layer between the bottom layer of the element or feature (e.g., photovoltaic element) and the top surface of the roofing product (in the over-pressed zone) may include, for example, compression molding, injection molding, co-extrusion, lamination, vacuum lamination (e.g., to remove air bubbles and outgassing), ultrasonic welding, vibration welding, laser welding, and IR welding. The method for completing the bonding will depend on whether the bonding is to be completed at a worksite (e.g., after installation of the roofing product on a roof deck as described below) or in a factory setting. Equipment intensive processes such as lamination and molding are especially suited to be performed in a factory setting; while use of adhesive materials can be suitable for use on site. In certain embodiments, an adhesive material is provided on the element or feature, covered by a releasable liner, as described above. Peeling the liner can expose the adhesive material, which can adhere the element or feature to the roofing product.

In some embodiments of this invention, the bottom surface of the photovoltaic element or both can be surface treated to enhance its affinity to the roofing product, or to the tie layer system, if used. Examples of the surface treatments include flame treatment, plasma treatment, corona treatment, ozone treatment, sodium treatment, etching, ion implantation, electron beam treatment, or combinations thereof. Surface treatments can also include chemical modification with reactive organic species such as polymerizable monomers, or coupling agents such as organosilanes, organozirconates or organotitanates.

In certain embodiments, a mechanical fastener is used together with a tie layer system (e.g., adhesive layer) to attach the element or feature to the over-pressed zone of roofing product. The mechanical fastener can be, for example, nails, staples, screws, clips or the like; such fasteners can attach the element or feature only to the roofing product on which it is disposed, or can go through the roofing product down to underlying roofing products, or even through to the roof deck itself. The mechanical fastener can provide for additional security of attachment of the element or feature under conditions of steep slope or high temperature, where a tie layer system may be subject to shear stresses. The mechanical attachment can be particularly helpful on the lower edge of the element or feature to prevent sliding movement down the roof. Moreover, mechanical attachment at the lower edge may impart added resistance to wind uplift detachment of the photovoltaic element or the roofing product. Mechanical attachment at one edge of the element or feature can also allow a degree of movement within the tie layer system to accommodate differential thermal expansion and contraction between the element or feature and the roofing product.

Figure 14:
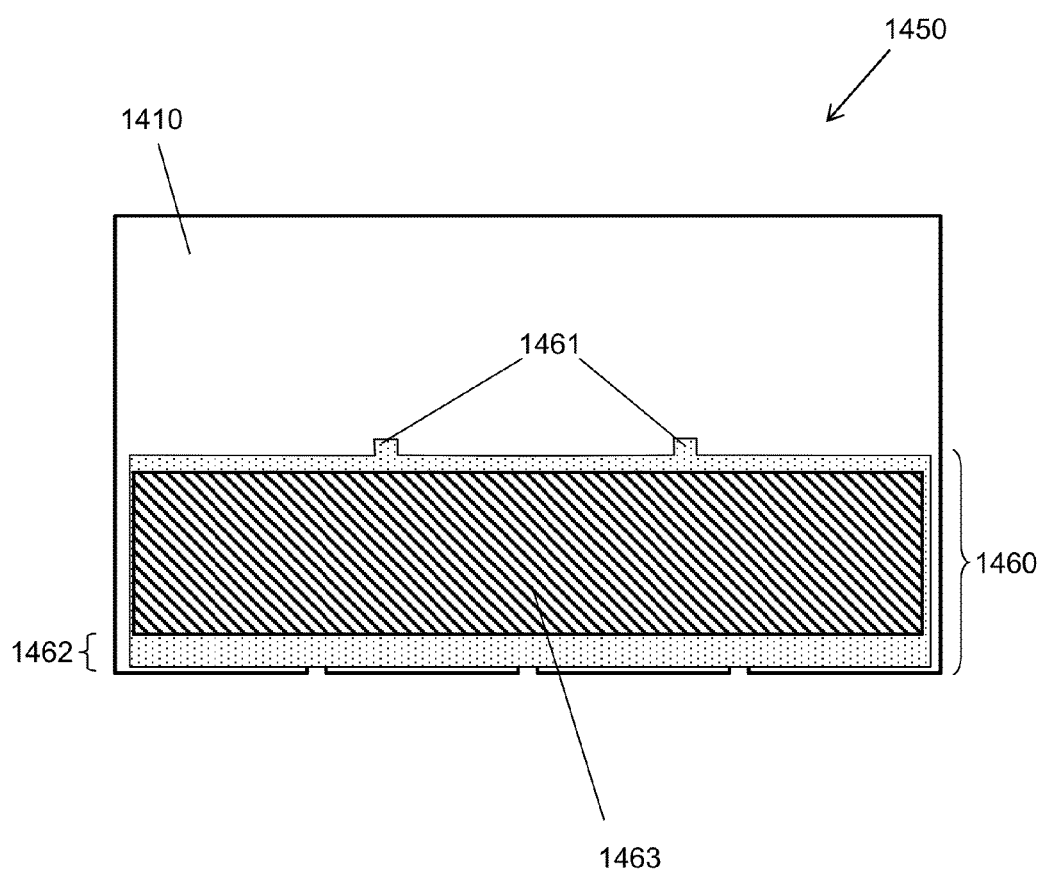
FIG. 14 is a schematic top view of a photovoltaic roofing element according to another embodiment of the invention.

In some embodiments, the photovoltaic element will include fastening tabs or a fastening zone (e.g., a marked area) to aid in the attachment of the photovoltaic element to the roofing product. Fastening zones and tabs may be configured using a flexible material, such as described in U.S. Pat. Nos. 5,729,946; 5,857,303; 5,887,743; 5,857,303 and 6,000,185, each of which is hereby incorporated by reference in its entirety. Flexible fastening zones can help to accommodate movement between the photovoltaic element and the roofing product, for example due to differential thermal expansion. For example, in one example of a photovoltaic roofing element 1450 of the invention, shown in top perspective view in FIG. 14, photovoltaic element 1460 (having photovoltaically active area 1463) is disposed in the over-pressed zones of roofing product 1410. Photovoltaic element 1460 includes both fastening tabs 1461 and a fastening zone 1462. The fastening tabs 1461 and fastening zone 1462 denote places that where fastening will cause no damage to the photovoltaic element (e.g., areas devoid of photovoltaic cells or electrical components such as wiring). The fastening tabs can in some embodiments be covered by an overlying course of roofing products (e.g., shingles). In certain embodiments, the photovoltaic element includes fastening tabs (e.g., as denoted by 1461 in FIG. 14), but no other fastening zone.

Figure 15:
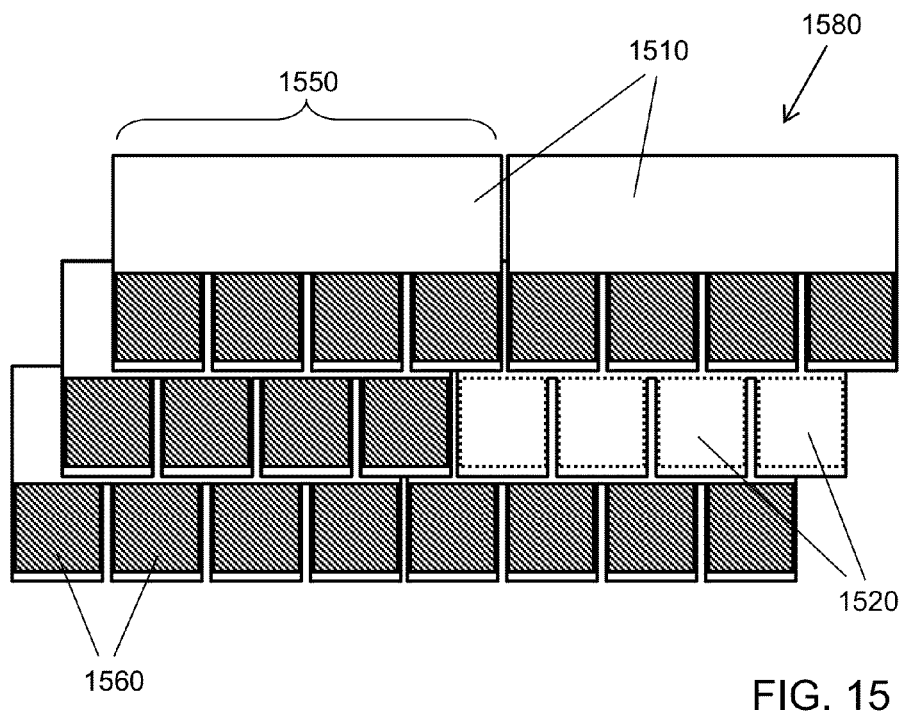
FIG. 15 is a schematic top view of a photovoltaic roofing system according to one embodiment of the invention.

Photovoltaic roofing elements based on shingles can be arrayed on a roof deck in a variety of ways. For example, in the photovoltaic roofing system 1580 shown in top schematic view in FIG. 15, photovoltaic roofing elements 1550 are arrayed as laterally-offset courses of shingles. Each roofing product 1510 is a four-tab shingle, with a over-pressed zone 1520 (shown exposed on one shingle) on each tab. (Of course, in other embodiments, the over-pressed zones can extend over the entire exposed area, or even over the entire shingle, as described above.) Photovoltaic elements 1560 are disposed in the over-pressed zones 1520. In one example, a shingle similar to the Grand Manor® Shangle®, available from Certain-Teed Corporation, has a shingle exposure height of 8 inches and an overall shingle dimension of 18 inches by 36 inches, with four tabs in the exposure area. Each of the tabs has a over-pressed zone formed thereon. An encapsulated T-cell photovoltaic element (United Solar Ovonic) equipped with a pressure-sensitive adhesive is attached to each of the over-pressed zones of each shingle. In other embodiments, for example when the shingle has one or more over-pressed zones having a height of about eight inches, an exposure area having a height of about eight inches, or both, a photovoltaic element having a height of about eight inches can be attached to each of the over-pressed zones of each shingle, or span the over-pressed zones of two or more of the tabs of each shingle.

Figure 16:
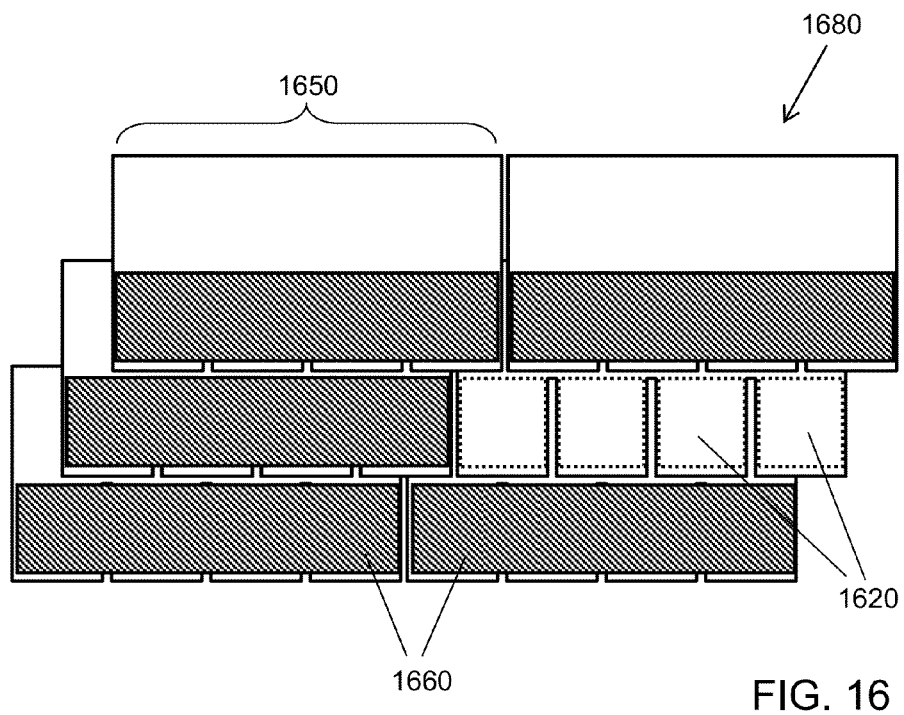
FIG. 16 is a schematic top view of a photovoltaic roofing system according to another embodiment of the invention.

As described above, more than one photovoltaic element may be disposed on each over-pressed zone. Similarly, a single photovoltaic element may be disposed on more than one over-pressed zone. For example, in the photovoltaic roofing system 1680 of FIG. 16, photovoltaic roofing elements 1650 are provided and arrayed as described above with reference to FIG. 15. Each photovoltaic element 1660 extends across and is disposed on the over-pressed zones 1620 (shown exposed on one shingle) of all four tabs of the shingle on which it is disposed. Each photovoltaic element can be, for example, a strip of four electrically interconnected T-cell photovoltaic elements in a laminate structure, with a pressure-sensitive adhesive on the bottom surface of the laminate structure.

Figure 17:
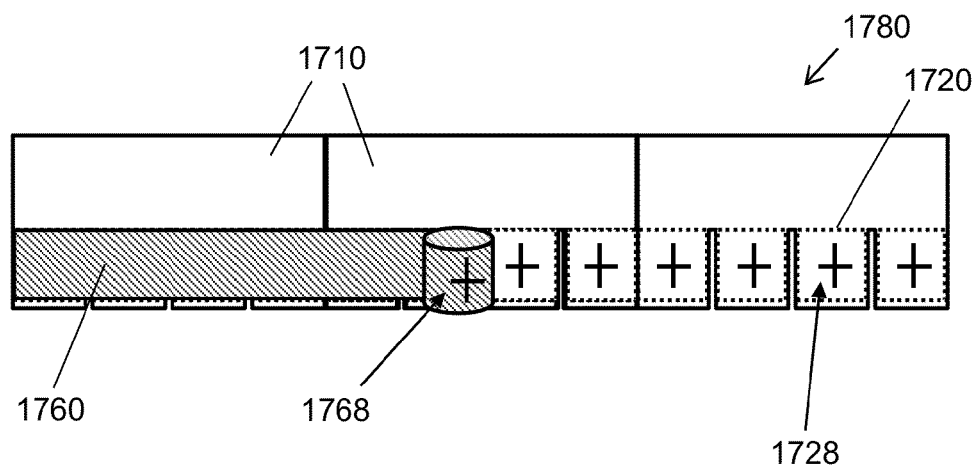
FIG. 17 is a schematic top view of a photovoltaic roofing system according to another embodiment of the invention.

In certain embodiments, in shingles similar to those described above with respect to FIGS. 12-16, the over-pressed zone(s) spans the length of the exposed area of each shingle. The shingles can be applied (e.g., in a typical fashion) by a roofing professional, who need not have any particular expertise with respect to photovoltaic systems. One or more extended length photovoltaic elements can then be disposed in the over-pressed zones as described above, spanning the length of a plurality of shingles). Accordingly in one embodiment of the invention, each photovoltaic element is disposed on more than one roofing product. For example, the Grand Manor® Shangle® exposure height of 8 inches could be entirely covered by the photovoltaic element (i.e., with a photovoltaic element having a height of about eight inches). In the photovoltaic roofing system 1780 shown in FIG. 17, a course of three shingles 1710 is arrayed on a roof deck. The shingles have over-pressed zones 1720, which include alignment marks 1728 as described above. The photovoltaic element 1760 is provided as a strip, in roll form, and has alignment marks 1768 on its bottom surface. As the photovoltaic element is unrolled and disposed on the over-pressed zones, the installer can align the alignment marks on the photovoltaic element with those on the over-pressed zone to ensure proper placement. Of course, alignment marks or features could alternatively (or also) be provided on the releasable liner. In other embodiments, alignment marks or features could be at other locations on the shingle, within the over-pressed zone, and/or on the photovoltaic element itself.

Photovoltaic roofing elements of the present invention can be fabricated using many techniques familiar to the skilled artisan. Roofing substrates can be made using a variety of techniques. For example, when the roofing substrate is an asphalt shingle or an asphalt non-woven glass reinforced laminate, the person of skill in the art can use methods described in U.S. Pat. Nos. 5,953,877; 6,237,288; 6,355,132; 6,467,235; 6,523,316; 6,679,308; 6,715,252; 7,118,794; U.S. Patent Application Publication 2006/0029775; and International Patent Application Publication WO 2006/121433, each of which is hereby incorporated herein by reference in its entirety. Photovoltaic roofing elements can be fabricated in a continuous process and then cut into individual elements as is done in the fabrication of asphalt shingles. When a continuous process is used, it can be necessary to individually prepare any electrical cables running between elements, for example by cutting the cables between elements and adding connectors to the cut ends.

In certain embodiments, the present invention may also be practiced using techniques described in U.S. Patent Application Publication nos. 2005/0072456 and 2004/0144043, and in U.S. Pat. No. 4,860,509, each of which is hereby incorporated herein by reference in its entirety.

Another aspect of the invention is a method for installing a photovoltaic roofing system on a roof deck. First, one or more roofing products as described above are installed on a roof deck. Then, one or more photovoltaic elements are disposed in the one or more over-pressed zones of the top surface of the roofing product. The roofing products can be installed robustly in a rugged manner to cover the roof; this step can be performed by a roofing professional, who need not have any particular expertise with respect to photovoltaic systems. The one or more photovoltaic elements can then be disposed in the over-pressed zones as described above. For example, when the photovoltaic element has a releasable liner covering an adhesive material, the releasable liner can be removed, and the photovoltaic elements affixed to the roofing product.

Another benefit derived in certain embodiments of the invention is that when photovoltaic elements are separately installed on a roof, it is possible to test the performance of the photovoltaic elements before they are attached to the shingles. Such testing can be performed, for example, immediately prior to attachment, so that any faulty photovoltaic elements are discovered before they are attached to the roofing product.

The roofing products described herein can be applied to the roof deck in bottom-up manner (i.e., from the lower edge of the roof to the upper edge), as is conventional. The photovoltaic elements can then be installed, for example, from the top of roof to the bottom. Top-down installation of the photovoltaic elements can allow the more fragile and potentially slippery photovoltaic elements to be applied in a more gentle manner, and without the need for an installer to walk on already-installed photovoltaic elements. Moreover, top-down installation of the photovoltaic elements can allow the adhesion of the photovoltaic elements to the roofing substrates to build over time, without the potential of being disturbed by an installer walking on or otherwise disturbing them. Of course, the photovoltaic elements can be installed in any other convenient order.

Of course, in other embodiments, the photovoltaic elements are disposed on the roofing product before the roofing product is installed on the roof. For example, the photovoltaic elements can be disposed on the roofing product at the worksite, but before installation. This can allow the individual materials to be transported more efficiently, and be put together to fit the particular dimensions of the roof. In other embodiments, the photovoltaic elements can be disposed on the roofing product in a factory setting. In such embodiments, the use of a roofing product with a over-pressed zone can increase adhesion of the photovoltaic roofing element without sacrificing properties of the rest of the roofing product, and can increase process flexibility during manufacture.

In certain embodiments, the photovoltaic elements are provided with removable cover elements covering their photovoltaically-active areas, as described in U.S. Patent Application Publication no. 2009/0000221 A1, which is hereby incorporated herein by reference in its entirety. The removable cover elements can be removed after installation to expose the photovoltaically active areas.

Another aspect of the invention is a kit for the installation of a photovoltaic roofing system, the kit comprising one or more roofing products as described above; and one or more photovoltaic elements. The one or more photovoltaic elements can be selected to be compatible, both in size and in adhesive characteristics as described above, with the roofing products. Accordingly, in certain embodiments, the one or more photovoltaic elements have a height of about eight inches. The one or more roofing products can have, for example, one or more over-pressed zones having a height of about eight inches; an exposure area having a height of about eight inches; or both.

It will be apparent to those skilled in the art that various modifications and variations can be made to the present invention without departing from the scope of the invention. Thus, it is intended that the present invention cover the modifications and variations of this invention provided they come within the scope of the appended claims and their equivalents.

What is claimed is:

1. A roofing product having a top surface and one or more overpressed zones, the roofing product comprising:
   a bituminous roofing substrate having a top surface; and
   a plurality of roofing granules, each disposed at the top surface of the bituminous roofing substrate in an over-pressed zone of the roofing product, each roofing granule embedded in and extending from the top surface of the roofing product, wherein the roofing granules are embedded so that
   in each over-pressed zone the average granule embed volume fraction is at least 0.7, the granule embed volume fraction for each roofing granule being the fraction of the roofing granule that is disposed beneath the level of the top surface of the bituminous roofing substrate, discounting any meniscus formed at the roofing granule; or
   in each over-pressed zone, the average distance between the top of the roofing granules and the top surface of the bituminous roofing substrate is 0.5 mm or less, discounting any meniscus formed at each roofing granule.

2. The roofing product according to claim 1, wherein each over-pressed zone exhibits a 0.20 gram loss or less in a rub test as described in ASTM D-4977.

3. The roofing product according to claim 1, wherein each one over-pressed zone exhibits a 0.10 gram loss or less in a rub test as described in ASTM D-4977.

4. The roofing product according to claim 1, wherein in each over-pressed zone, the roofing granules are embedded so that the average granule embed volume fraction is at least 0.70.

5. The roofing product according to claim 1, wherein in each over-pressed zone, the roofing granules are embedded so that the average distance between the top of the roofing granules and the top surface of the bituminous roofing substrate is 0.5 mm or less, discounting any meniscus formed at each roofing granule.

6. The roofing product according to claim 1, wherein one over-pressed zone extends along substantially the entire top surface of the bituminous roofing substrate.

7. The roofing product according to claim 1, wherein the top surface of the bituminous roofing substrate has an exposure area, and one over-pressed zone extends along substantially the entire exposure area.

8. The roofing product according to claim 1, wherein the top surface of the bituminous roofing substrate has an exposure area, the exposure area having one or more of the over-pressed zones formed thereon.

9. The roofing product according to claim 8, wherein the exposure area further comprises a standard-pressed granule-coated zone adjacent the one or more over-pressed zones.

10. The roofing product according to claim 9, wherein the granules in the standard-pressed granule coated zone are of substantially the same color and distribution as the granules in the one or more over-pressed zones.

11. A photovoltaic roofing element comprising:
    a roofing product according to claim 1; and
    one or more photovoltaic elements disposed on the one or more over-pressed zones of the roofing product.

12. The photovoltaic roofing element according to claim 11, wherein a tie layer system adheres the photovoltaic element in the over-pressed zone.

13. The photovoltaic roofing element according to claim 11, wherein a mechanical fastener is used in the attachment of the photovoltaic elements to the roofing product.

14. The photovoltaic roofing element according to claim 11, wherein more than one photovoltaic element is disposed on each over-pressed zone.

15. The photovoltaic roofing element according to claim 11, wherein each photovoltaic element is disposed on more than one over-pressed zone.

16. The photovoltaic roofing element according to claim 15, wherein each photovoltaic element is disposed on more than one roofing product.

17. A method for installing a photovoltaic roofing system, the method comprising:
    installing on a roof deck a roofing product according to claim 1; then
    disposing one or more photovoltaic elements on the one or more over-pressed zones of the roofing products.

18. A kit for the installation of a photovoltaic roofing system, the kit comprising:
    one or more roofing products according to claim 1; and
    one or more photovoltaic elements.

19. The roofing product according to claim 1, wherein in each over-pressed zone, the roofing granules are embedded so that the average granule embed volume fraction is at least 0.85, discounting any meniscus formed at each roofing granule.

20. The roofing product according to claim 1, wherein in each over-pressed zone, the roofing granules are embedded so that the average distance between the top of the roofing granules and the top surface of the bituminous roofing substrate is 0.2 mm or less, discounting any meniscus formed at each roofing granule.

21. The roofing product according to claim 1, wherein
in each over-pressed zone the average granule embed volume fraction is at least 0.7; and
in each over-pressed zone, the average distance between the top of the roofing granules and the top surface of the bituminous roofing substrate is 0.5 mm or less, discounting any meniscus formed at the lateral surface of the roofing granule.

22. The roofing product according to claim 21, wherein each over-pressed zone exhibits a 0.20 gram loss or less in a rub test as described in ASTM D-4977.

23. The roofing product according to claim 22, wherein
in each over-pressed zone the average granule embed volume fraction is at least 0.85; and
in each over-pressed zone, the average distance between the top of the roofing granules and the top surface of the bituminous roofing substrate is 0.2 mm or less, discounting any meniscus formed at the lateral surface of the roofing granule.

* * * * *